US010621881B2

(12) United States Patent
Black et al.

(10) Patent No.: US 10,621,881 B2
(45) Date of Patent: *Apr. 14, 2020

(54) SYSTEMS AND METHODS OF ALERT GENERATION

(71) Applicant: WSE Hong Kong Limited, Hong Kong (CN)

(72) Inventors: Adam S. Black, Blanot (FR); Rasil Warnakulasooriya, Medfield, MA (US); Ken Davis, Barcelona (ES); Eric Friedman, Brookline, MA (US)

(73) Assignee: WSE HONG KONG LIMITED, Hong Kong (HK)

( * ) Notice: Subject to any disclaimer, the term of this patent is extended or adjusted under 35 U.S.C. 154(b) by 85 days.

This patent is subject to a terminal disclaimer.

(21) Appl. No.: 15/849,261

(22) Filed: Dec. 20, 2017

(65) Prior Publication Data
US 2018/0114456 A1 Apr. 26, 2018

Related U.S. Application Data

(63) Continuation of application No. 14/958,722, filed on Dec. 3, 2015, now Pat. No. 9,886,868.

(51) Int. Cl.
| G06F 15/173 | (2006.01) |
| G09B 7/00 | (2006.01) |
| G06Q 10/06 | (2012.01) |
| H04L 29/08 | (2006.01) |
| H04L 12/26 | (2006.01) |

(Continued)

(52) U.S. Cl.
CPC ........... G09B 7/00 (2013.01); G06Q 10/0639 (2013.01); G06Q 10/06398 (2013.01); G06Q 10/063114 (2013.01); H04L 43/04 (2013.01); H04L 43/045 (2013.01); H04L 43/06 (2013.01); H04L 43/08 (2013.01); H04L 43/16 (2013.01); H04L 67/22 (2013.01); H04W 4/025 (2013.01); H04W 24/00 (2013.01)

(58) Field of Classification Search
CPC ................ G09B 7/00; G06Q 10/0639; G06Q 10/063114; G06Q 10/06398; H04W 4/025; H04W 24/00; H04L 43/04; H04L 43/16; H04L 43/045; H04L 67/22; H04L 43/08; H04L 43/06
USPC ............. 709/206, 207, 224; 705/7.15, 7.42; 455/404.2, 456.1

See application file for complete search history.

(56) References Cited

U.S. PATENT DOCUMENTS

| 9,886,868 B2 | 2/2018 | Black et al. |
| 2004/0033475 A1* | 2/2004 | Mizuma ................ G06Q 10/06 434/219 |

(Continued)

*Primary Examiner* — Liang Che A Wang
*Assistant Examiner* — Johnny B Aguiar
(74) *Attorney, Agent, or Firm* — Quarles & Brady LLP

(57) ABSTRACT

Systems and methods for providing an alert to a user device based on generated parameters are disclosed herein. The system can include: a content management server; and a memory communicatively connected to the content management server via a communication network. The memory can include: a content library database; and a user profile database. The system can include a user device and a supervisor device. The system can include a content management server that can calculate a risk probability and can generate and send an alert to the supervisor device when the risk probability exceeds a threshold level.

18 Claims, 15 Drawing Sheets

(51) Int. Cl.
*H04W 4/02* (2018.01)
*H04W 24/00* (2009.01)

(56) References Cited

U.S. PATENT DOCUMENTS

| | | | |
|---|---|---|---|
| 2013/0106613 A1* | 5/2013 | Lee | H04W 4/021 340/691.3 |
| 2014/0220536 A1* | 8/2014 | Dow | G09B 7/00 434/350 |
| 2014/0335497 A1* | 11/2014 | Gal | G09B 7/00 434/323 |
| 2015/0254597 A1* | 9/2015 | Jahagirdar | G06Q 10/063114 705/7.15 |
| 2016/0300178 A1* | 10/2016 | Perry | G06Q 10/063112 |

\* cited by examiner

SYSTEMS AND METHODS OF ALERT GENERATION

CROSS-REFERENCES TO RELATED APPLICATIONS

This application is a continuation of U.S. Non-Provisional application Ser. No. 14/958,722 filed on Dec. 3, 2015 and entitled "SYSTEMS AND METHODS OF ALERT GENERATION", which is herein incorporated by reference in its entirety for all purposes.

BACKGROUND

This application relates to the field data transmission and network optimization.

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on (i.e. work using) other more specific or more general communications protocols, except for the physical layer that directly deals with the transmission media.

BRIEF SUMMARY

One aspect of the present disclosure relates to a system for providing an alert to a user device based on generated parameters. The system includes a content management server; and a memory communicatingly connected to the content management server via a communication network. The memory can include: a content library database including information relating to one or several content programs; and a user profile database including information tracking user relevant data generated from at least one of: (1) interaction between a user and a user device; and (2) interaction between the user device and the content management server. The system can include a user device communicatingly connected to the content management server via the communication network. In some embodiments, the user device includes: a first communications subsystem that can exchange data with a server via a communication network. The first communication subsystem can include location determining features that can determine a physical location of the user device. The user device can include a first I/O subsystem that can convert electrical signals to user interpretable outputs. The system can include a supervisor device communicatingly connected to the content management server via the communications network. The supervisor device can include: location determining features that can determine a physical location of the user device; and a second I/O subsystem that can convert electrical signals to user interpretable outputs. In some embodiments, the content management server can: receive an identifier of a user from the user device, which the identifier includes user device location information; identify current program status parameters of the user, which current program status parameters identify the user's progress through at least one of the one or several content programs; select a model function based on the current program status parameter; calculate a model function value with the selected model function; calculate a risk probability with the model function value, which risk probability characterizes the risk of a user not achieving a desired outcome; designate the supervisor device for receipt of an alert; generate and send an alert to the supervisor device when the risk probability exceeds a threshold level.

In some embodiments, the supervisor device can include one or a plurality of supervisor devices associated with different user-supervisors. In some embodiments, the content management server can receive supervisor device location information from the supervisor device, and the supervisor device can be designated based on location information received from the user device and location information received from the supervisor device. In some embodiments, the supervisor device includes a personal supervisor device and a shared supervisor device.

In some embodiments, generating and sending the alert includes: determining a usage state of the personal supervisor device and the shared supervisor device; and identifying one of the personal supervisor device and the shared supervisor device as a default device. In some embodiments, generating and sending the alert further includes sending the alert to the shared supervisor device when the determined usage state indicates current use of the shared supervisor device. In some embodiments, generating and sending the alert further includes sending the alert to the personal supervisor device when the determined usage state indicates current non-use of the shared supervisor device.

In some embodiments, the content management server can determine triggering of a risk calculation. In some embodiments, determining triggering of a risk calculation can include: retrieving a status trigger threshold from the memory; comparing the current program status parameters of the user to the status trigger threshold; and triggering a risk calculation when the current program status parameters at least meet the status trigger threshold. In some embodiments, selecting the model function based on the current program status parameter includes: identifying potential model functions; determining a model function associated with the status trigger threshold triggering the risk calculation; and selecting the model function associated with the status trigger threshold triggering the risk calculation.

In some embodiments, generating and sending the alert can include: retrieving a risk threshold associated with at least one of: the model function; and the current program status parameters; comparing the risk threshold and the risk probability; and determining to generate and send the alert based on the comparison of the risk threshold and the risk probability. In some embodiments, it is determined to generate and send the alert based on the comparison of the risk threshold and the risk probability when the comparison of the risk threshold and the risk probability indicates that the risk probability exceeds the risk threshold.

In some embodiments, the risk probability indicates a likelihood of a user associated with the risk probability not achieving a desired outcome. In some embodiments, the desired outcome is the completion of a specified portion of the one or several content programs. In some embodiments, the alert includes an intervention including one or more actions the implementation of which decreases the risk probability. In some embodiments, generating and sending the alert includes selecting the intervention from an intervention aggregate comprises a plurality of interventions.

One aspect of the present disclosure relates to a method of providing an alert to a user device based on generated parameters. The method includes: receiving an identifier of a user at a content management server from a user device via a communications network, which identifier includes user device location information; identifying current program status parameters of the user with the content management server, which current program status parameters identify the user's progress through at least one of the one or several content programs; selecting a model function based on the current program status parameter with the content management server; calculating a model function value with the selected model function with the content management server; calculating a risk probability with the model function value with the content management server, which risk probability characterizes the risk of a user not achieving a desired outcome; generating an alert with the content management server; and sending the alert to the supervisor device when the risk probability exceeds a threshold level.

In some embodiments, the method includes determining triggering of a risk calculation. In some embodiments, determining triggering of a risk calculation includes: retrieving a status trigger threshold from the memory; comparing the current program status parameters of the user to the status trigger threshold; and triggering a risk calculation when the current program status parameters at least meet the status trigger threshold. In some embodiments, selecting the model function based on the current program status parameter includes: identifying potential model functions; determining a model function associated with the status trigger threshold triggering the risk calculation; and selecting the model function associated with the status trigger threshold triggering the risk calculation. In some embodiments, generating and sending the alert includes: retrieving a risk threshold associated with at least one of: the model function; and the current program status parameters; comparing the risk threshold and the risk probability; and determining to generate and send the alert based on the comparison of the risk threshold and the risk probability. In some embodiments, it is determined to generate and send the alert based on the comparison of the risk threshold and the risk probability when the comparison of the risk threshold and the risk probability indicates that the risk probability exceeds the risk threshold.

One aspect of the present disclosure relates to a system for providing an alert to a user device based on generated parameters. The system includes a supervisor device including a personal supervisor device and an other supervisor device. In some embodiments, the personal supervisor device includes: a first communications subsystem that can exchange data with a server via a communication network, the communication subsystem including location determining features that can determine a physical location of the user device; and a first I/O subsystem that can convert electrical signals to user interpretable outputs. In some embodiments, the other supervisor device includes: a second communications subsystem that can exchange data with a server via the communication network, the communication subsystem includes location determining features that can determine a physical location of the user device; and a second I/O subsystem that can convert electrical signals to user interpretable outputs. The system can include a content management server. The content management server can: receive location data from the supervisor device, which location data identifies the location of the supervisor device and the use status of the supervisor device; identify one of the personal supervisor device and the other supervisor device as recipient of an alert based on the received location data; and send an alert to the identified one of the personal supervisor device and the other supervisor device. In some embodiments, the supervisor device can: receive the alert, wherein the alert includes alert data; launch an alert interface; and display a visual representation of the alert data.

In some embodiments, the supervisor device can: receive location signals from a navigation system; generate location data; and transmit location data to the content management server. In some embodiments, the location data identifies a use status for at least one of the personal supervisor device and the other supervisor device.

In some embodiments, displaying the visual representation of the alert data includes generating control signals to control the operation of a display of the supervisor device. In some embodiments, the alert data includes a risk probability, which risk probability identifies a risk of a user not achieving a desired outcome. In some embodiments, the desired outcome includes completion of a desired portion of a program.

In some embodiments, displaying the risk probability includes the generation and display of a risk indicator. In some embodiments, the risk indicator includes a graphical display of the risk probability. In some embodiments, the risk indicator includes a numeric display of the risk probability. In some embodiments, displaying the risk probability includes generating and displaying at least one of: a user page; a follow-up queue page; and an alert data page. In some embodiments, displaying the risk probability includes generating and displaying at least one of: a student-user identifier; a progress indicator; and a next step indicator. In some embodiments, the progress indicator includes a progress rate indicator.

In some embodiments, the system includes a memory communicatingly connected to the content management server via the communication network, the memory includes: a content library database including information relating to one or several content programs; and a user profile database including information tracking user relevant data generated from at least one of: (1) interaction between a user and a user device; and (2) interaction between the user device and the content management server. In some embodiments, the system includes a user device communicatingly connected to the content management server via the communication network.

In some embodiments, the content management server can: receive an identifier of a user from the user device, which identifier includes user device location information; identify current program status parameters of the user, which current program status parameters identify the user's progress through at least one of the one or several content programs; select a model function based on the current program status parameter; calculate a model function value with the selected model function; and calculate the risk probability with the model function value.

In some embodiments, the content management server can determine triggering of a risk calculation. In some embodiments, determining triggering of a risk calculation includes: retrieving a status trigger threshold from the memory; comparing the current program status parameters of the user to the status trigger threshold; and triggering a risk calculation when the current program status parameters at least meet the status trigger threshold. In some embodiments, sending the alert includes: retrieving a risk threshold associated with at least one of: the model function; and the current program status parameters; comparing the risk threshold and the risk probability; and determining to send the alert based on the comparison of the risk threshold and the risk probability.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
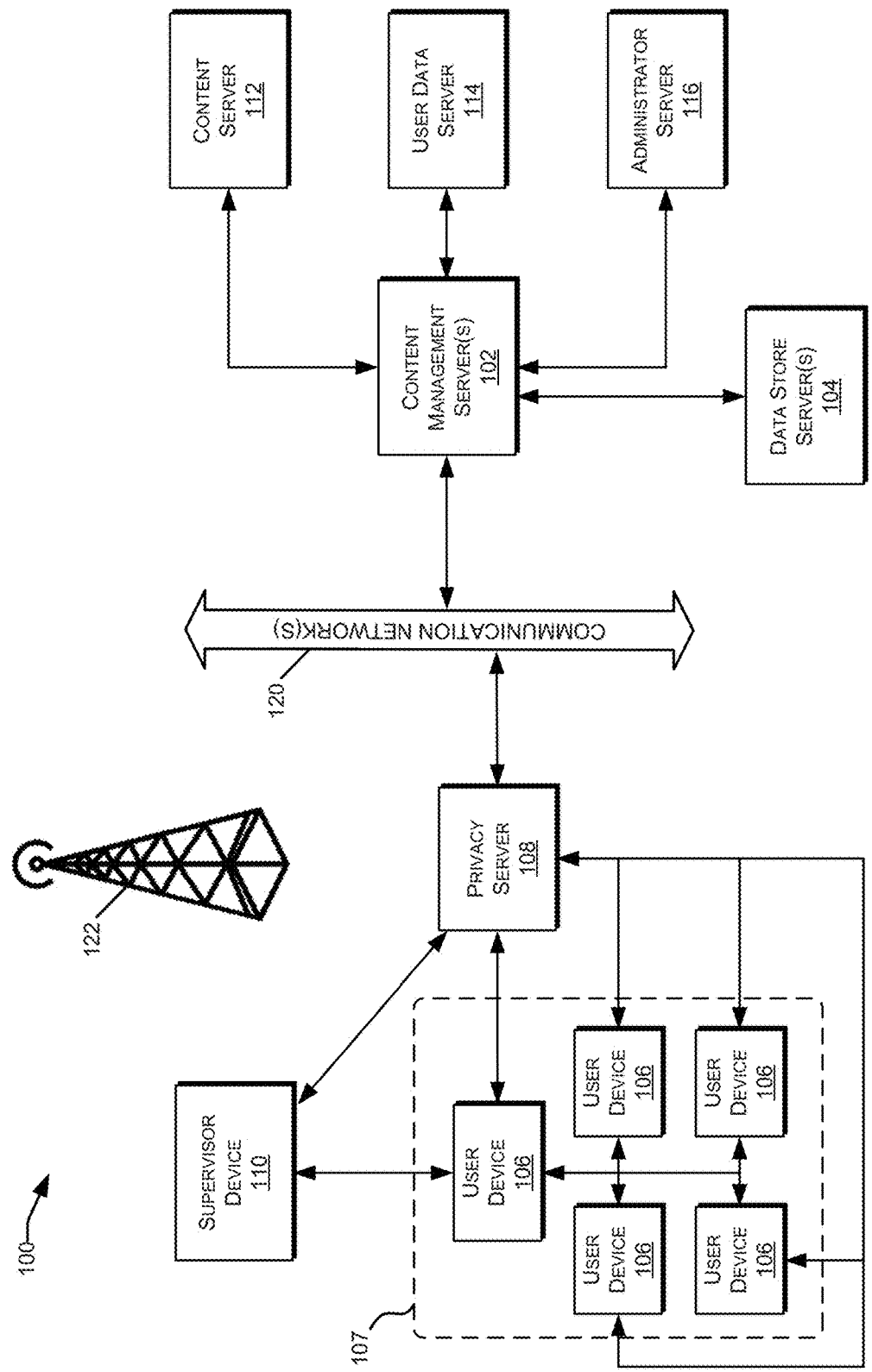
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
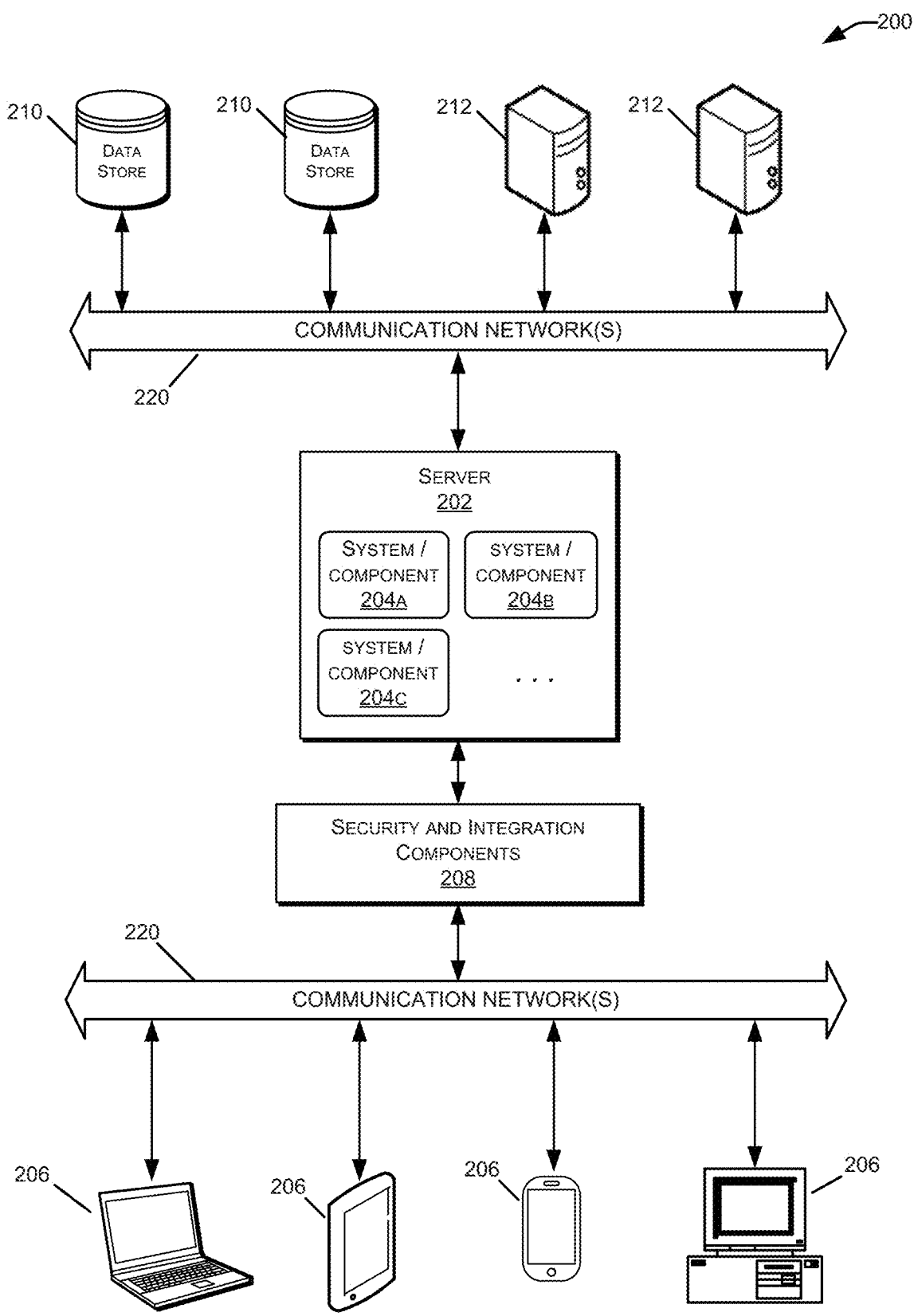
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
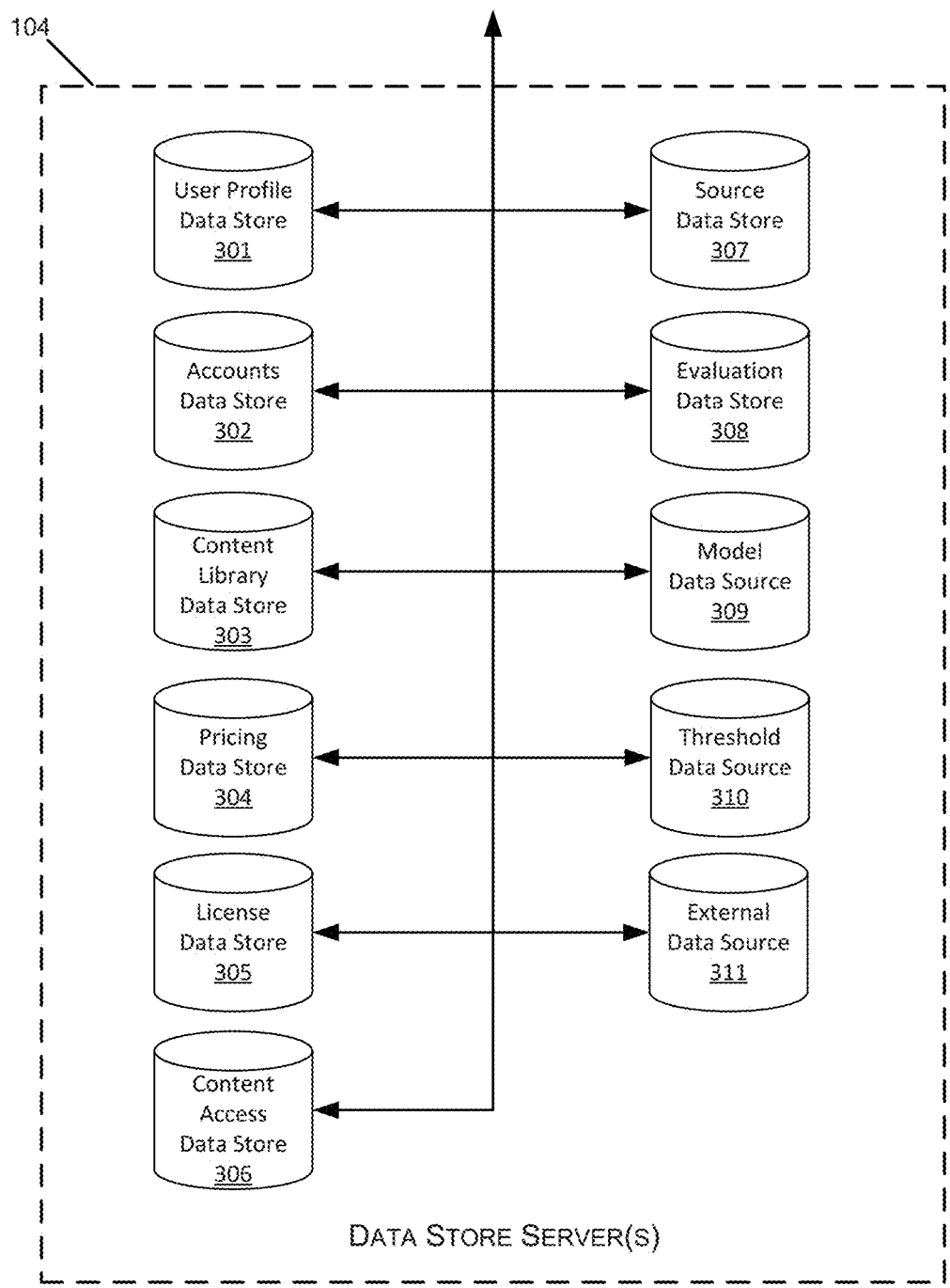
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-311 may reside in storage on a single computer server 104 (or a single server farm or cluster) under the control of a single entity, or may reside on separate servers operated by different entities and/or at remote locations. In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-311, including their functionality and types of data stored therein, are illustrative and non-limiting. Data stores server architecture, design, and the execution of specific data stores 301-311 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

In some embodiments, the user profile database 301 can include information relating to a user's status, location, or the like. This information can identify, for example, a device a user is using, the location of that device, or the like. In some embodiments, this information can be generated based on any location detection technology including, for example, on a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a program comprising an aggregate of data, content, and/or activities, and can identify, for example, progress through the program, or through the aggregate of data, content, and/or activities forming the program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user, may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these one or several models can include one or several models that can be used to calculate one or several model functions values. In some embodiments, these one or several model function values can be used to calculate a risk probability, which risk probability can characterize the risk of a user such as a student-user failing to achieve a desired outcome such as, for example, failing to achieve a desired level of completion of a program, for example in a pre-defined time period. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion status can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, and as will be discussed at greater length below, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, these user parameters can identify, for the level of student-user interaction and/or involvement in one or several programs. These parameters can include, for example, the number of successful encounters and/or the number of successful encounters per day, the amount of time since a student-user's last activity, and specifically whether the amount of time since the last activity is greater than or less than 40 days, the fraction of completed lessons and/or activities, the initial stage and/or level of the student-user at the start of the program, and/or the total number units in the program. These parameters can further include, for example: an activity score parameter; a booked first encounter; a booked next encounter; cancelled encounters; center identify; repeated end-of lesson activities; end-of lesson score; first encounter result; lesson completion speed; longest break between activities; missed encounter; number of active student-users in the center; number of complementary activities; number of contracted units; number of encounters per month; number of long activity breaks; percent intro program duration period; unit completion percentage; priority; renewal status; risk estimates; starting stage; time between booking encounter and having encounter; time since last activity; time since last encounter; time to first encounter; time to first lesson; time to unit completion; and unsuccessful encounters.

In some embodiments, an encounter can be an interaction between a student-user and a supervisor in which content from the content distribution network 100 is consumed. In some embodiments, this can include one or several lessons, activities, tests, quizzes, or the like that can be performed during an interaction between a student-user and a supervisor. In some embodiments, determining the number of successful encounters can include identifying a program, identifying encounters within that program, determining which of the encounters in the program have been successfully completed by the student-user such as by, for example, retrieving evaluation data for completed encounters and comparing the evaluation data to a success threshold, determining the number of days since the student-user started the program, and dividing the number of successful encounters for the student-user by the number of days since the student-user started the program.

In some embodiments, an activity can include any interaction with the content distribution network 100, and specifically with content form the content distribution network 100. In some embodiments, a first value such as a "1" can be associated with a student-user when more than a specified number of days such as forty days, has passed since the last activity and a second value such as a "0" can be associated with a student-user when less than a specified number of days such as forty days, has passed since the last activity.

In some embodiments, the fraction of completed lessons and/or activities can be the number of completed lessons and/or activities divided by the total number of lessons and/or activities in the program and/or that the student-user has contracted for. In some embodiments, the completion of a lesson and/or activity occurs when all of the content associated with the lesson and/or activity has been consumed and/or when a final assessment associated with the lesson and/or activity has been completed.

In some embodiments, the initial stage and/or level of the student-user at the start of the program can identify a skill level of the student-user at the time of the start of the program. In some embodiments, this skill level can be ascertained via, for example, one or several assessments. In some embodiments, a threshold can delineate between start levels associated with greater risk and start levels associated with lesser risk. In some embodiments, a start value associated with a greater risk can be assigned a first value, such as a "1," and a start value associated with a lesser risk can be assigned and/or associated with a second value, such as a "2."

In some embodiments, the total number of units in the program can identify the size of the user's program. In some embodiments, for example, the user can control the size of the program by, for example, electing more or fewer units for inclusion in the program. In some embodiments, a parameter based on the total number of units can be calculated by taking the total number of units for a user and multiplying the total number of units by a value such as, for example, 2, 3, 4, 5, 6, 7, 8, 9, 10, and/or any other or intermediate value.

A threshold database 310, also referred to herein as a threshold database, can store one or several threshold values. These one or several threshold values can delineate between states or conditions. In one exemplary embodiments, for example, a threshold value can delineate between an acceptable user performance and an unacceptable user performance, between content appropriate for a user and content that is inappropriate for a user, between risk levels, or the like.

In addition to the illustrative data stores described above, data store server(s) 104 (e.g., database servers, file-based storage servers, etc.) may include one or more external data aggregators 311. External data aggregators 311 may include third-party data sources accessible to the content management network 100, but not maintained by the content management network 100. External data aggregators 311 may include any electronic information source relating to the users, content resources, or applications of the content distribution network 100. For example, external data aggregators 311 may be third-party data stores containing demographic data, education related data, consumer sales data, health related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

Figure 4:
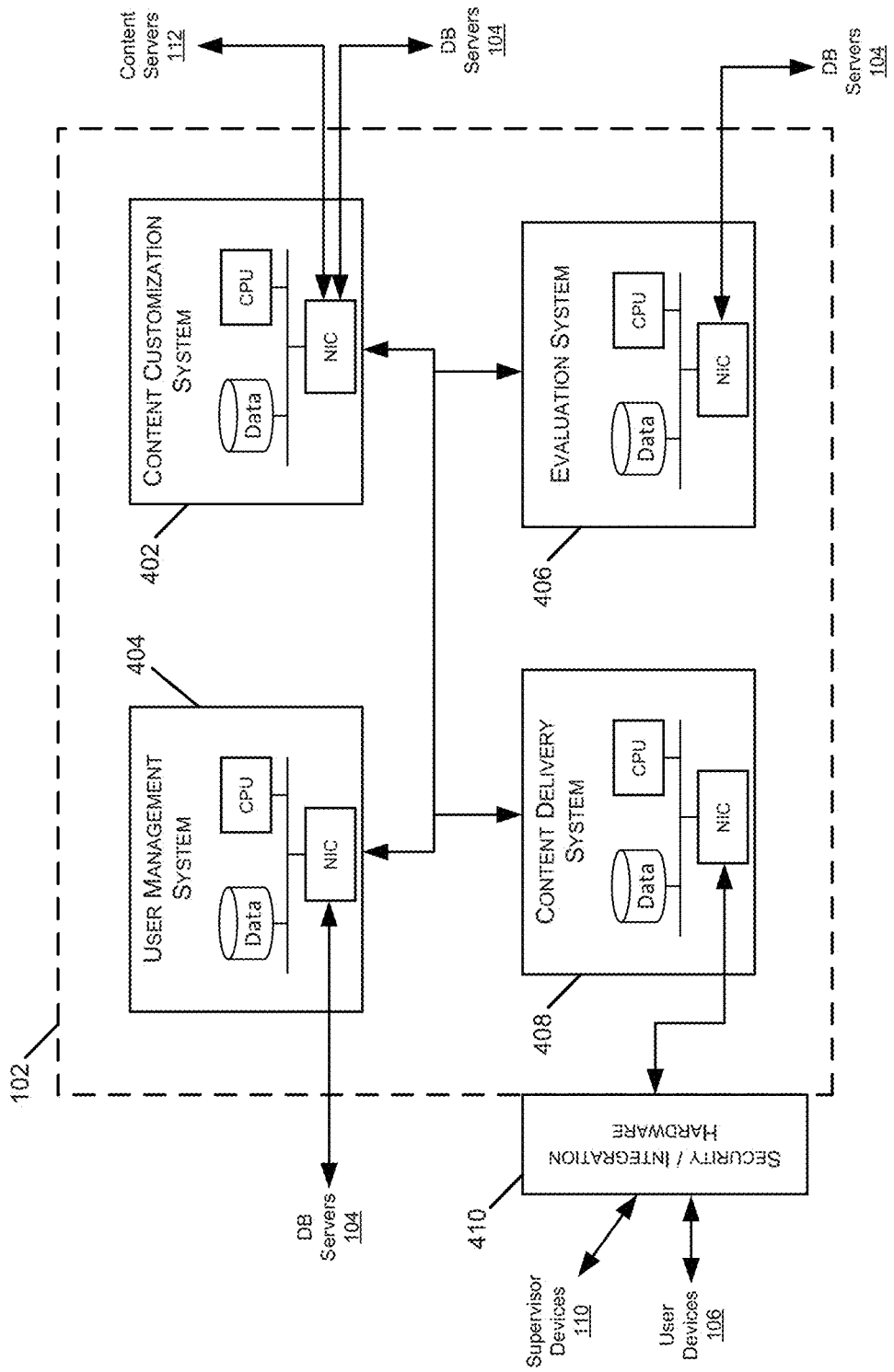
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
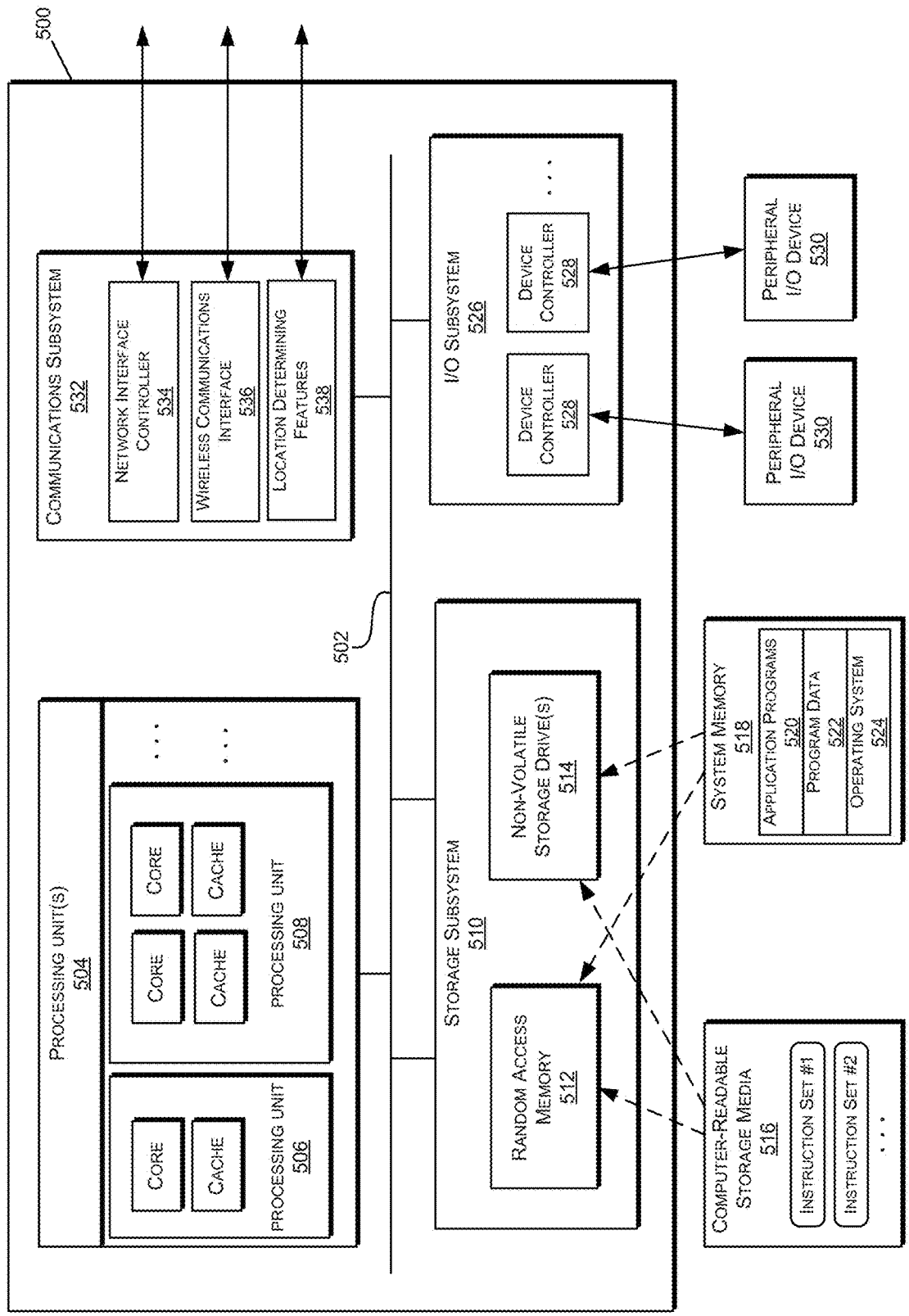
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 310). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
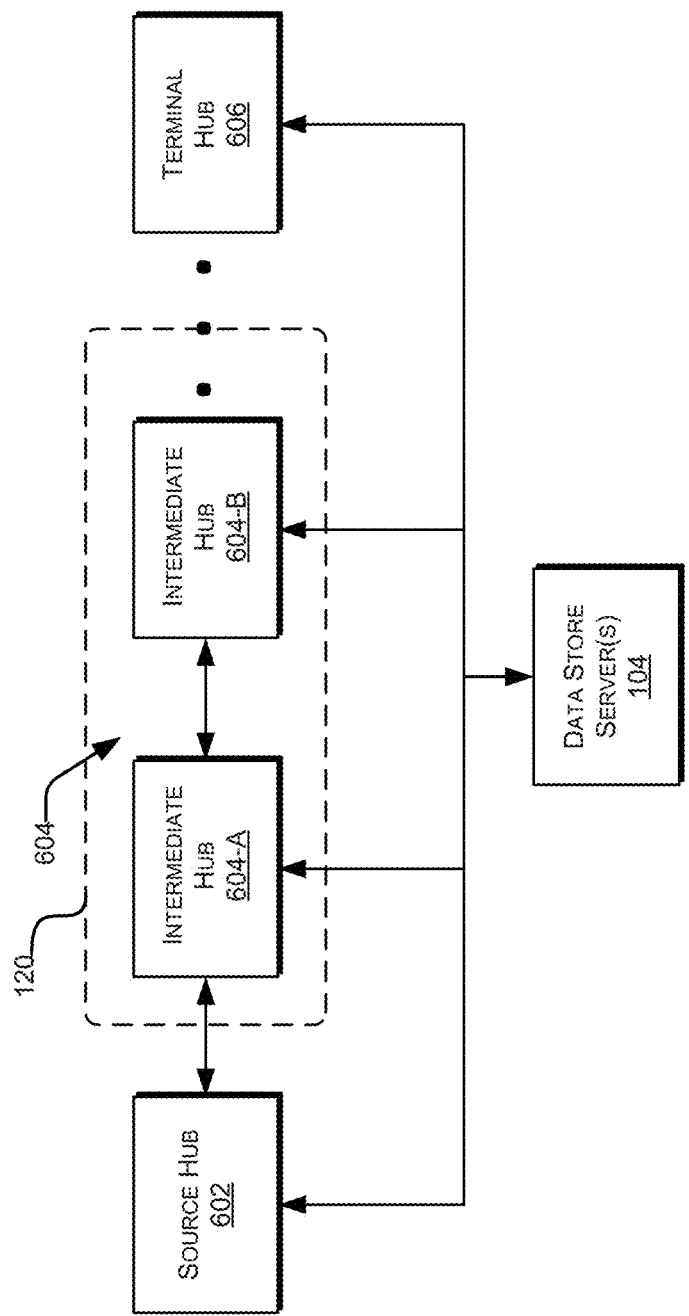
FIG. 6 is a block diagram illustrating one embodiment of the communication network.

With reference now to FIG. 6, a block diagram illustrating one embodiment of the communication network. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
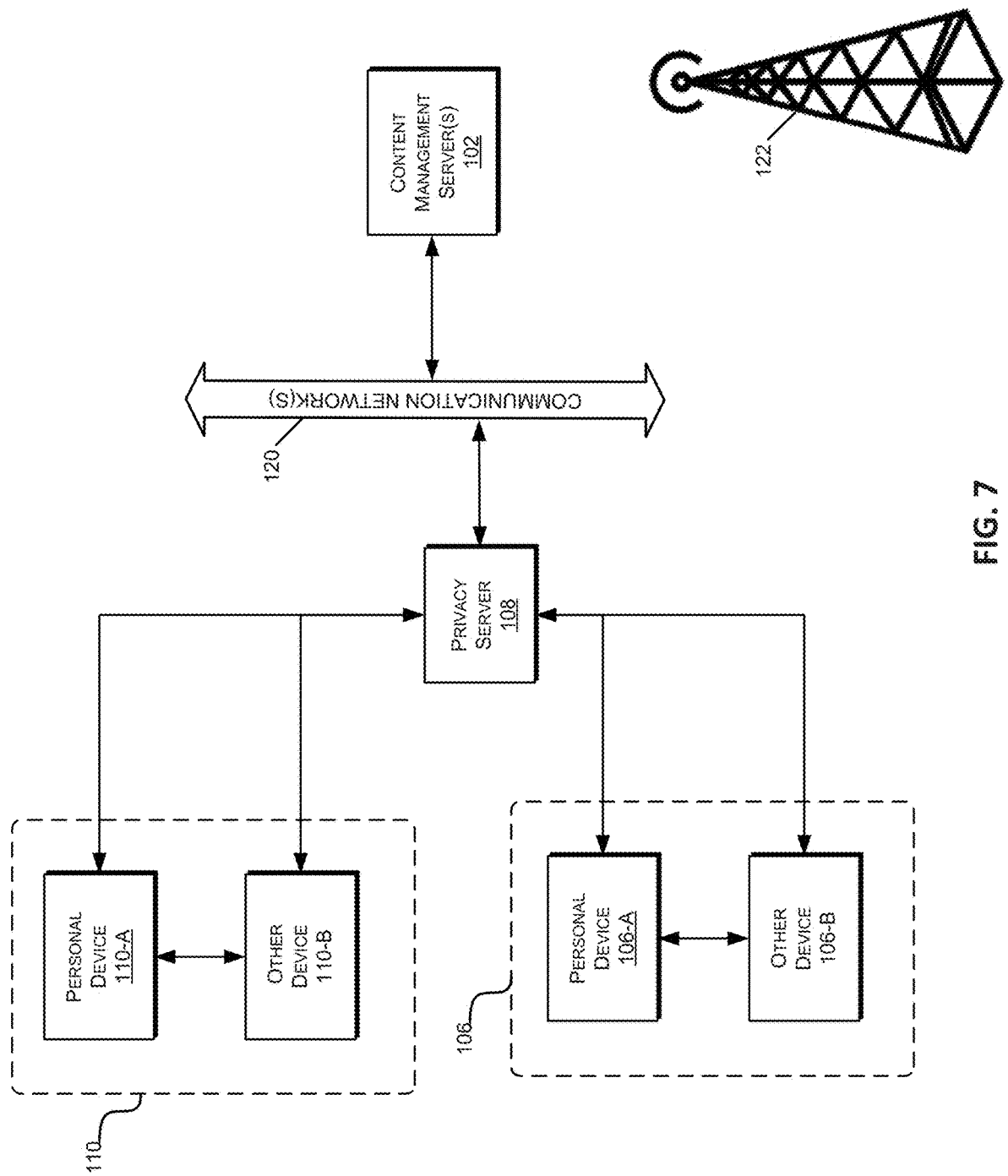
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Speaking specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

Figure 8:
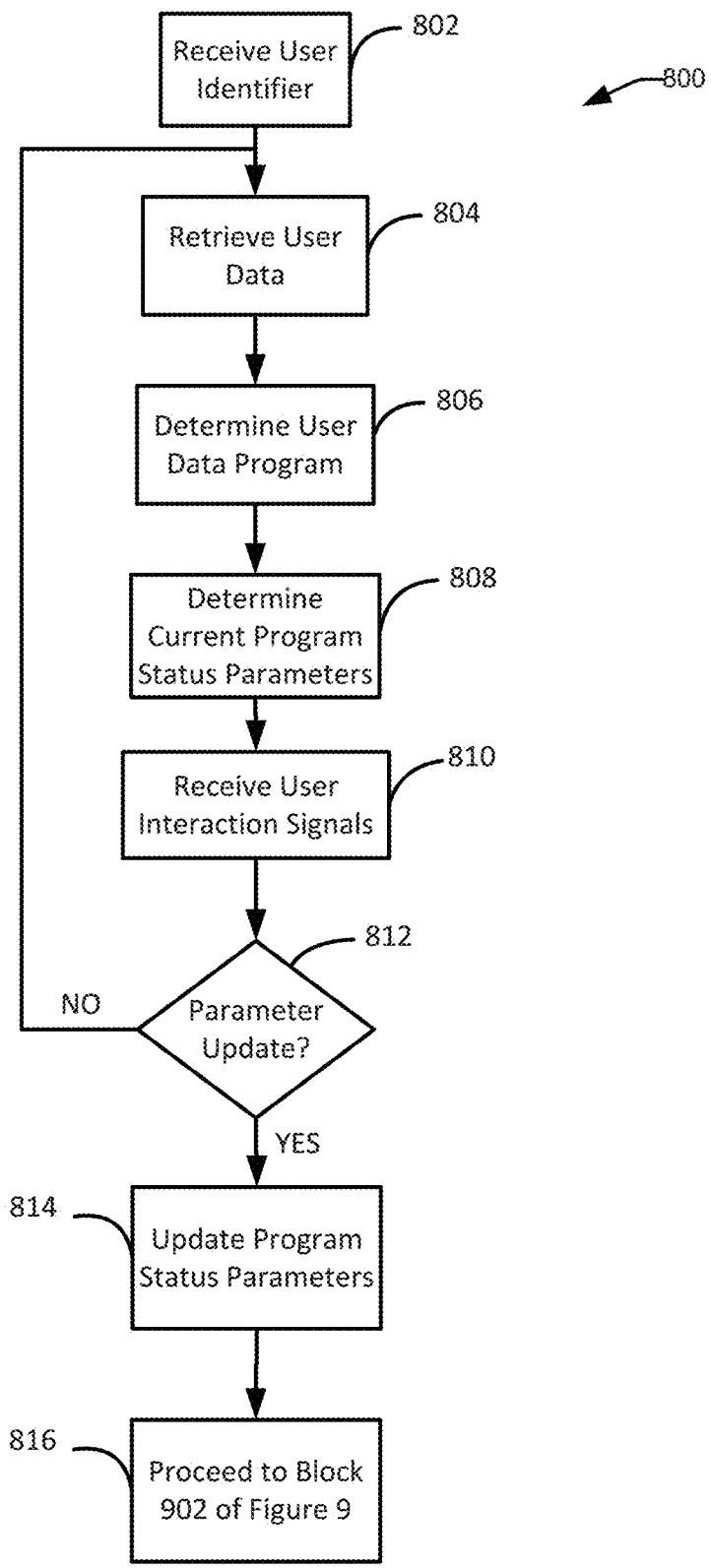
FIG. 8 is a flowchart illustrating one embodiment of a process for updating a parameter.

With reference now to FIG. 8, a flowchart illustrating one embodiment of a process 800 for updating a parameter is shown. The process 800 can be performed by some or all of the components of the content distribution network 100. The process 800 begins at block 802 wherein a user identifier is received. In some embodiments, the user identifier can be received from one of the user devices 106. The user identifier can include, for example, information identifying the user, and in some embodiments, uniquely identify the user. This can include, for example, a username and password, a character string unique to the user, an IP address uniquely associated with the user, or the like.

After the user identifier has been received, the process 800 proceeds to block 804 wherein user data is retrieved. In some embodiments, the user data can be retrieved and/or received from the user profile database 301. This user data can be retrieved and/or received by querying the user profile database 301 for information relating to the user identified by the user identifier received in block 802. In response to this query, the user profile database can identify user data and can provide the user data to, for example, the server 102.

After the user data has been retrieved, the process 800 proceeds to block 806 wherein a user data program, also referred to herein as a program or a user program is determined. In some embodiments, this can include identifying one or several programs associated with the user and/or to which the user has access. In some embodiments, these one or several programs can be identified in the user data retrieved in block 804.

After the user program has been determined, the process 800 proceeds to block 808 wherein the one or several current program status parameters determined. In some embodiments, these one or several current program status parameters can relate to the users progress through the program and/or interaction with the content distribution network 100 or the content of the content distribution network 100. In some embodiments, these one or several current program status parameters can be identified within the user data retrieved in block 804 and the current program status parameters can be determined by extracting data identifying the current program status parameters from the user data retrieved in block 804.

After the current program status parameters have been determined, the process 800 proceeds to block 810 wherein one or several signals indicative of user interaction with the content distribution network 100 and/or the content thereof are received by, for example, server 102 from the user device 106. In some embodiments, these one or several signals can comprise one or several requests for content by the user device 106, one or several requests for participation in an activity by the user device, one or several responses from the user device 106 to content provided by the content distribution network 100, or the like. In some embodiments, these signals can be received by the server 102 via the communication network 120.

After the user interactions signals have been received, the process 800 proceeds to decision block 812 wherein it is determined whether the update a parameter. In some embodiments, this determination can include determining whether some or all of the received user interactions signals result in an update to one or several of the current program status parameters. If it is determined that none of the parameters are to be updated, the process 800 returns to block 804 and proceeds as outlined above.

If it is determined that one or several of the parameters are to be updated, then the process 800 proceeds to block 814 where the identified one or several parameters are updated. In some embodiments, this can include the recalculation of the parameters as discussed above with respect to the model database 309. In some embodiments, updating the parameters can include storing the updated program status parameters as new current program status parameters in the database server 104, and particularly in, for example, the user profile database 301. After the program status parameters have been updated, the process 800 continues to block 816 and proceeds to block 902 of FIG. 9.

Figure 9:
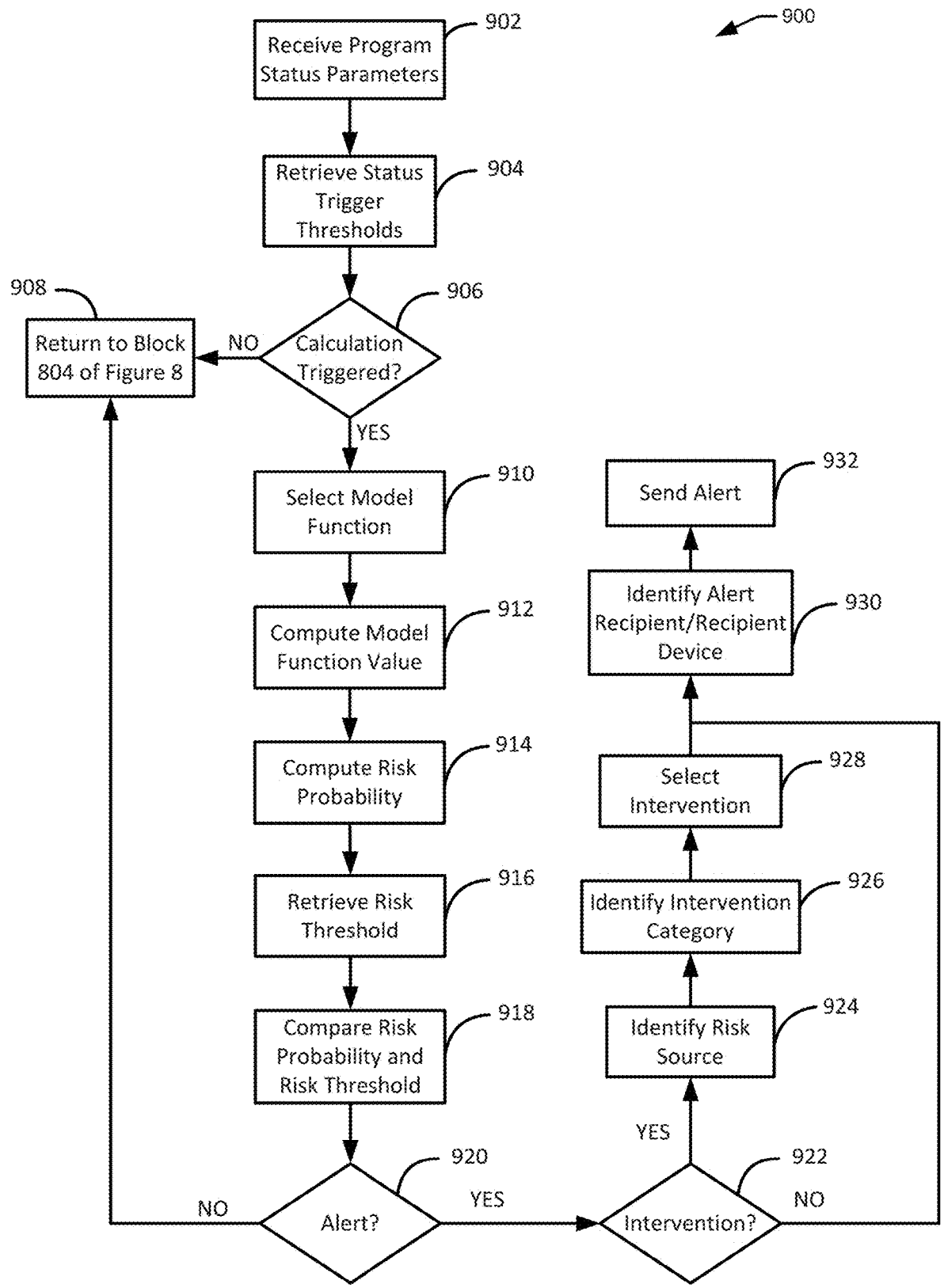
FIG. 9 is a flowchart illustrating one embodiment of a process for generating and sending an alert.

With reference now to FIG. 9, a flowchart illustrating one embodiment of a process 900 for generating and sending an alert is shown. The process 900 can be performed by one or several components of the content distribution network 100. Specifically, in some embodiments, the steps of process 900 can be performed by the server 102. The process 900 begins at block 902 wherein one or several program status parameters are received. This can include the receiving of one or several parameters from the model database 309, which parameters can include some or all of the parameters discussed above with respect to model database 309. In some embodiments, these one or several program status parameters can be received by the server 102 from the database server 104, and particularly from the user profile database 301.

After the program status parameters have been received, the process 900 proceeds to block 904 wherein one or several status trigger thresholds are retrieved and/or received. In some embodiments, the status trigger thresholds can identify one or several points in progression through a program at which risk probability calculations are performed. In some embodiments, these one or several status trigger thresholds can be received and/or retrieved from the database server 104, and particularly from the threshold database 310.

After the status trigger thresholds have been retrieved, the process 900 proceeds to decision block 906 wherein it is determined if a risk probability calculation is triggered. In some embodiments, this can include a comparison of one or several program status parameters to the status trigger thresholds. If it is determined that a new one of the status trigger thresholds has been reached, then a calculation can be triggered. If it is determined that a risk probability calculation has not been triggered, then the process 900 continues to block 908 and returns to block 804 of FIG. 8.

If it is determined that the risk probability calculation has been triggered, then the process 900 proceeds to block 910 wherein a model function is selected. In some embodiments, the model function can be selected by determining the model function associated with the triggered status trigger threshold. This can include querying the model database 309 and/or the threshold database 310 for information identifying the model function associated with the triggered status trigger threshold.

After the model function has been selected, the process 900 proceeds to block 912 wherein the model function value is calculated. In some embodiments, the model function value can be calculated by inputting one or several values associated with current program status parameters into the selected model function. After the model function value has been calculated, the process 900 proceeds to block 914 where the risk probability is calculated. In some embodiments, the calculation of the risk probability can include the retrieval of the risk probability function, the inputting of the model function value into the risk probability function, and calculating the output of the risk probability function including the model function value. In some embodiments, the risk probability can be stored in one of the databases such as, for example, the user profile database 301.

In some embodiments, the calculation of the risk probability can further include determining an impact value of the one or several of the current program status parameters used in calculating the model function value. In some embodiments, this impact value can identify the relative contribution of some or all of the one or several of the current program status parameters to the overall risk probability. In some embodiments, an impact value can be calculated for each of the current program status parameters used in calculating the model function value, and the current program status parameters can then be ranked according to their calculated impact value from, for example, the current program status parameter causing the greatest increase to the calculated risk probability to the current program status parameter causing the smallest increase to the calculated risk probability.

After the risk probability has been calculated, the process 900 proceeds to block 916 wherein a risk threshold is retrieved. In some embodiments, the risk threshold can delineate between an acceptable risk probabilities and unacceptable risk probabilities. The risk threshold can be retrieved from the database server 104, and can be particularly retrieved from the threshold database 310.

After the risk threshold has been retrieved, the process 900 proceeds to block 918 wherein the calculated risk probability and the risk threshold are compared. In some embodiments, this comparison can determine whether the calculated risk probability is an acceptable risk probability or is an unacceptable risk probability. This comparison can be made by, for example, the server 102.

After the risk probability in the risk threshold have been compared, the process 900 proceeds to decision block 920 wherein it is determined whether to generate an alert. In some embodiments, for example, an alert is generated when the comparison of the risk probability and the risk threshold indicates an unacceptable risk probability and alternatively, an alert is not generated when the comparison of the risk probability and the risk threshold indicates an acceptable risk probability. If it is determined that an alert is not to be generated, then the process 900 proceeds to block 908 and returns to block 804 of FIG. 8.

If it is determined that an alert is to be generated, the process 900 proceeds to decision block 922 where it is determined whether to generate and/or recommend an intervention. In some embodiments, this determination can be made based on information stored in the database server 104. Specifically, in some embodiments, the user profile database 301 and/or the content library database 303 can include information indicating whether interventions should be recommended for a user and/or for a program.

If it is determined to generate and/or recommend an intervention, the process 900 proceeds to block 924 when a risk source identified. In some embodiments, the identification of the resource can be based on the impact values determined with the calculation the risk probability. In some embodiments, the determination of the risk source can include identifying one or several of the parameters having the greatest contribution to the increase in the risk probability. In some embodiments, this determination can be based on the relative ranking of the one or several parameters based on their impact values.

After the risk source has been identified, the process 900 proceeds to block 926 wherein an intervention category is identified. In some embodiments, the intervention category can comprise a group of potential interventions that can be associated with, for example, the identified risk sources. Specifically, in some embodiments the intervention category can include one or several interventions directed towards remedying deficiencies identified in one or several of the program status parameters. Intervention categories can be identified in the content library database 303.

After the intervention category has been identified, the process 900 proceeds to block 928 wherein an intervention is selected. In some embodiments, the intervention can be selected from the identified intervention category. In some embodiments, for example, an intervention can be selected based on one or several user attributes such as, for example, the learning style of the user, the location of the user, or the like.

After the intervention has been selected, the process 900 proceeds to block 930 wherein one or several alert recipients and/or recipient devices are identified. In some embodiments, for example, one or several recipient devices can include the user device 106 associated with the student-user and/or one or several supervisor devices 110. In some embodiments, one or several recipient devices can be selected based on location information received for the user device 106 of the student-user and based on location information received for one or several supervisor devices 110. In some embodiments, for example in which the intervention includes personal interaction, the one or several recipient devices can be selected that are relatively most proximate to the user device 106. In some embodiments, this determination of proximity can be made by the server 102.

After the one or several alert recipients and/or recipient devices have been identified, the process 900 proceeds to block 932 wherein the alert is sent. In some embodiments, the alert can be sent to the recipient devices via the communication network 120. Thus, in some embodiments, the alert can be sent to one or several supervisor devices 110 and/or the user device 106. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining a use location of the devices 106, 110 based on determining if the devices 106, 110 and/or accounts are actively being used. Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

Figure 10:
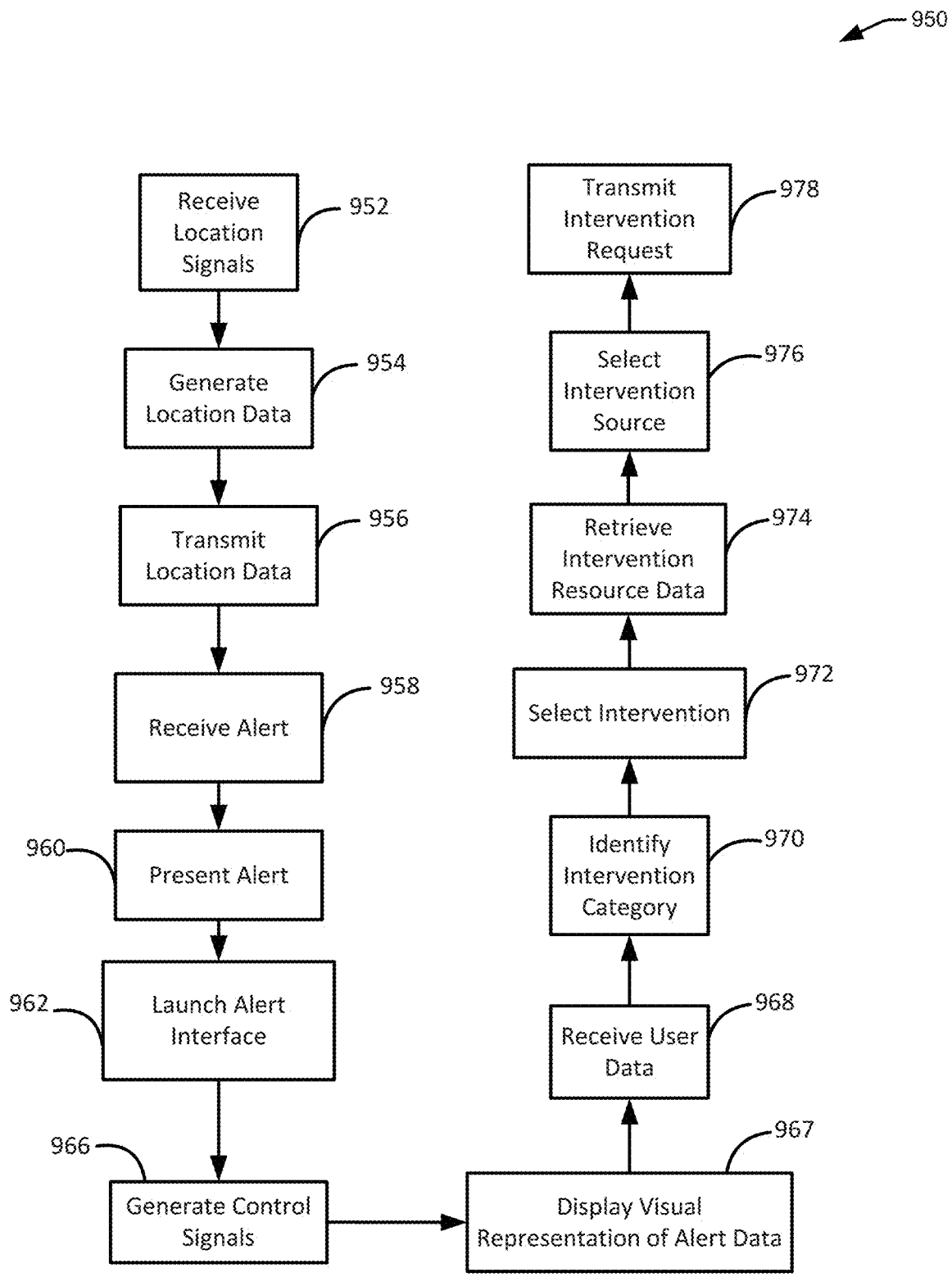
FIG. 10 is a flowchart illustrating one embodiment of a process for operating a supervisor device.

With reference now to FIG. 10, a flowchart illustrating one embodiment of a process 950 for operating a supervisor device 110 is shown. The process begins at block 952, wherein location signals are received. In some embodiments, the location signals can be received from the navigation system 122 and can be received by, for example, the communications subsystem 532. After the location signals are received, the process 950 proceeds to block 954 wherein location data is generated. In some embodiments, the generation of location data can include the determination of the location of the supervisor device 110 based on the received location signals. In some embodiments, the location data can further include the generation of use location information identifying a use status of the supervisor device 110, and specifically identifying whether that the supervisor device 110 is currently in use.

After the location data has been generated, the process 950 proceeds to block 956 where the location data is transmitted. In some embodiments, the transmission of the location data can include the transmission of the user location information. In some embodiments, this can include electronic transmission of the location data to the server 102 via the communication network 120. After the location data has been transmitted, the process 950 proceeds block 958 wherein an alert is received. In some embodiments, the alert can be received by the supervisor device 110 from the server 102 via the communication network 120 at the communications subsystem 532.

After the alert has been received, the process 950 proceeds to block 960 wherein the alert is presented to, for example, the supervisor-user. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

After the alert has been presented, the process 950 proceeds to block 962 wherein the alert interfaces launched. In some embodiments, the alert interface can comprise an application through which the supervisor-user can access alert data, student-user data associated with the alert, and/or any intervention data associated with the alert. After the alert interface has been launched, the process 950 proceeds to block 966 wherein control signals are generated. In some embodiments, these control signals can be generated by the I/O subsystem 526 to control one or several hardware components such as displays, screens, speakers, or the like, of the supervisor device 110 to provide the alert data to the user.

After the control signals and generated, the process 950 proceeds to block 967 wherein a representation of the alert date is provided, and specifically wherein a visual representation of the alert data is provided to the supervisor-user via, for example, the screener display of the supervisor device 110. In some embodiments, the display of the visual representation of the alert data can include, for example, a display of one or more of: a user page; a follow-up queue page; and an alert data page. In some embodiments, the display of the visual representation of the alert data can include allowing a user such as a supervisor-user to move between one or more of these identified pages. The features of the user page, the follow-up queue page, and the alert data page will be discussed at greater lengths below. In some embodiments, the visual representation is provided to the user according to the control signals generated in block 966.

After the visual representation of the alert data has been displayed, the process 950 proceeds to block 968 wherein user data is received. In some embodiments, this user data can be received from the database server 104, and specifically from the user profile database 301 view the server 102 and/or the communication network 120. This user data can identify, for example, the location of the student-user, one or several learning preferences of the student-user, historic information for the student-user, and/or the like.

After the user data has been received, the process 950 proceeds to block 970 wherein an intervention category is identified. In some embodiments, the intervention category can comprise a group of potential interventions that can be associated with, for example, the identified risk sources, and in some embodiments, the intervention category can comprise a group of potential interventions that can be associated with, for example, one or several user attributes. Specifically, in some embodiments the intervention category can include one or several interventions directed towards remedying deficiencies identified in one or several of the program status parameters. Intervention categories can be identified in the content library database 303.

After the intervention category has been identified, the process 950 proceeds to block 972 wherein an intervention is selected. In some embodiments, the intervention can be selected from the identified intervention category. In some embodiments, for example, an intervention can be selected based on one or several user attributes such as, for example, the learning style of the user, the location of the user, or the like.

After the intervention has been selected, the process 950 proceeds to block 974, wherein intervention resource data is retrieved. In some embodiments, the intervention resource data can identify resources, including human resources that can be used for the intervention. In one particular embodiment, for example, the intervention resource data can identify one or several supervisor-users who could provide and/or be involved in providing the intervention. In some embodiments, the intervention resource data can be retrieved from the database server 104, and specifically can be retrieved from the user profile database 301.

After the intervention resource data has been retrieved, the process 950 proceeds to block 976, wherein an intervention source is identified. In some embodiments, the intervention source can be the resource, including one or several human resources that will be used in the intervention. In some embodiments in which the intervention source is a human resource, the human resource can be selected for the intervention based on, location data gathered from the supervisor device(s) 110 associated with selected human resource, location data gathered from the user device(s) 106 associated with the student-user, intervention subject matter as identified in the content library database 303, human resource competency and/or skill level as identified in the user profile database 301, or the like.

After the intervention source has been selected, the process 950 proceeds to block 978, wherein an intervention request is transmitted. In some embodiments, this can include the transmission of the intervention request to the supervisor device (s) 110 for the intervention source selected in block 976. In some embodiments, the intervention request can be transmitted via the communication network 120.

Figure 11:
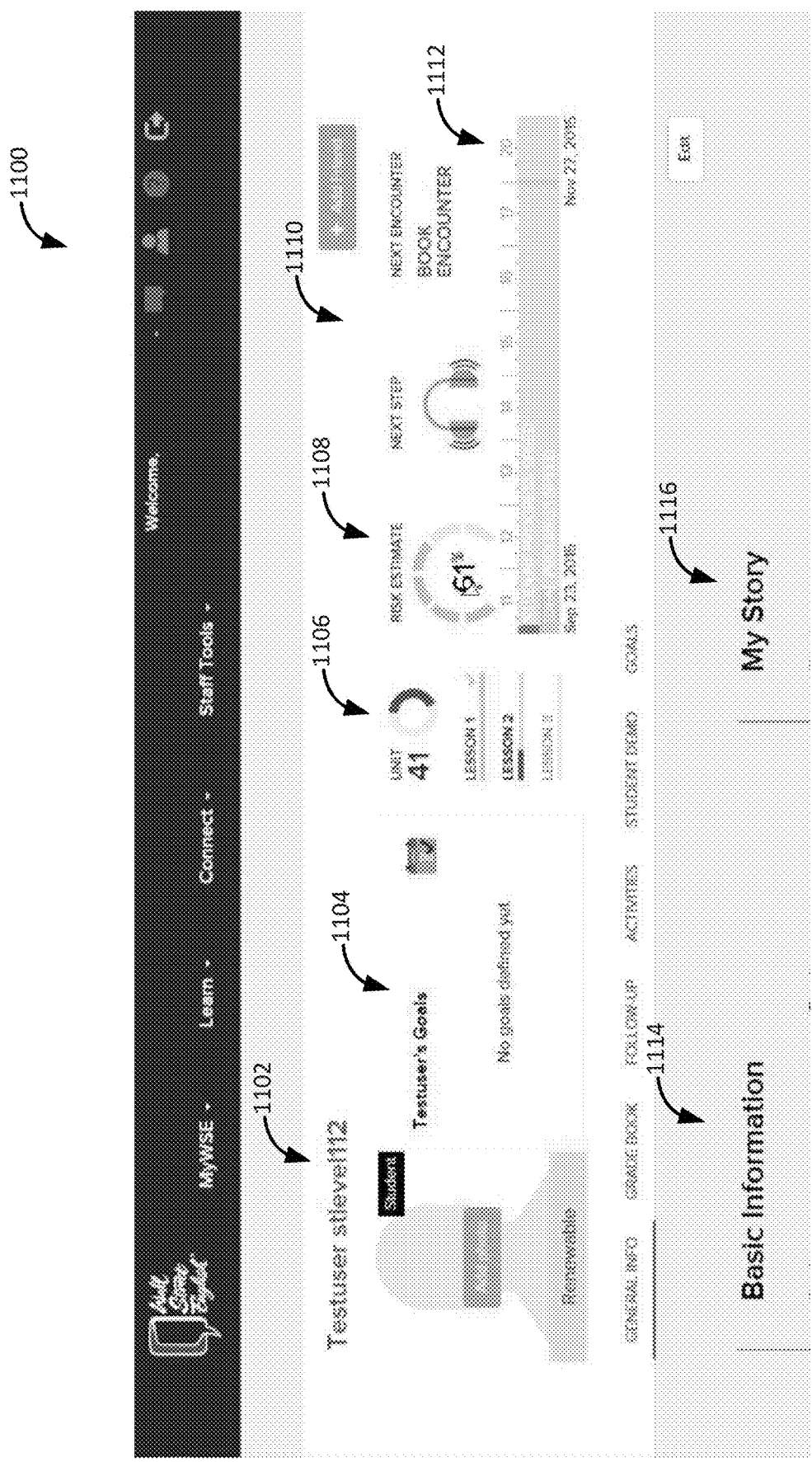
FIGS. 11 and 12 depict embodiments of a user page in a Graphical User Interface (GUI).
Figure 12:
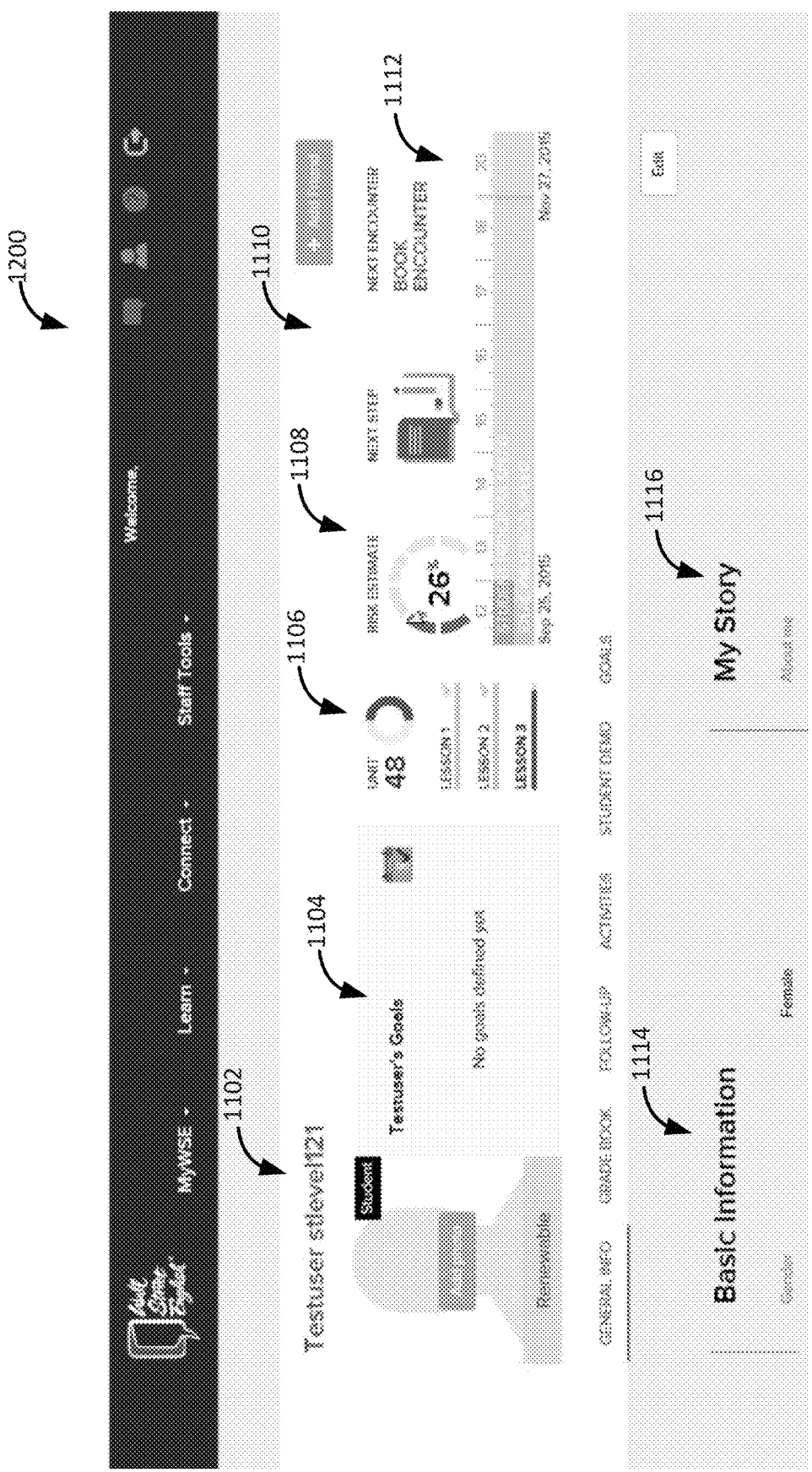

With reference now to FIGS. 11 and 12, depictions of a user page 1100, 1200 in a Graphical User Interface (GUI) are shown. In some embodiments, the user page 1100, 1200 can be all or a part of the visual representation of the alert data of block 967 of FIG. 9. The user page 1100, 1200 can include a student-user identifier 1102 that can be, either encoded to conceal the student-user's identity, or un-encoded, and an identifier of student-user goals. In some embodiments, the user page 1100, 1200 can further include a progress indicator 1106 that can visually indicate a student-user's progress through a program and/or through one or several components of the program such as one or several units and/or through one or several components of the units such as lessons, activities, encounters, or the like. In some embodiments, the progress indicator 1106 can be a visual indicator such as shown in FIG. 6.

The user page 1100, 1200 can further include a risk indicator 1108 that can indicate the student-user's risk probability of not achieving a desired, specified outcome. In some embodiments, this risk indicator 1108 can numerically display a risk percent, and in some embodiments, this risk indicator can graphically display a risk percent. In the embodiments shown in the user page 1100, 1200 the risk indicator both graphically and numerically displays the risk percent.

The user page 1100, 1200 can further include a next-step indicator 1110. In some embodiments, the next action indicator 1110 can identify the next step and/or next encounter. In some embodiments, the next step can be an, as yet un-started, step and in some embodiment, the next encounter can be an, as yet un-started, encounter. In some embodiments, a step can be any activity and/or lesson that can be performed by the student user without direct interaction with a supervisor-user, and in some embodiments, an encounter can be any activity and/or lesson that is performed with direct interaction with a supervisor-user.

The user page 1100, 1200 can include a progress speed indicator 1112, also referred to herein as a progress rate indicator. In some embodiments, the progress speed indicator 1112 can display the rate of progress of the student-user in the program. In some embodiments, the progress speed indicator 1112 can further display an ideal and/or desired rate of progress. In some embodiments, the progress speed indicator 1112 can comprise a first bar graph indicating the rate of progress of the student-user and a second bar graph indicating the ideal rate of progress.

The user page 1100, 1200 can further display basic information 1114 relating to the student-user such as, for example one or several user attributes like learning style, skill level, or the like. In some embodiments, the user page 1100, 1200 can include a story indicator 1116 which can display one or several personal user attributes such as, for example, interests, hobbies, friends, or the like.

Figure 13:
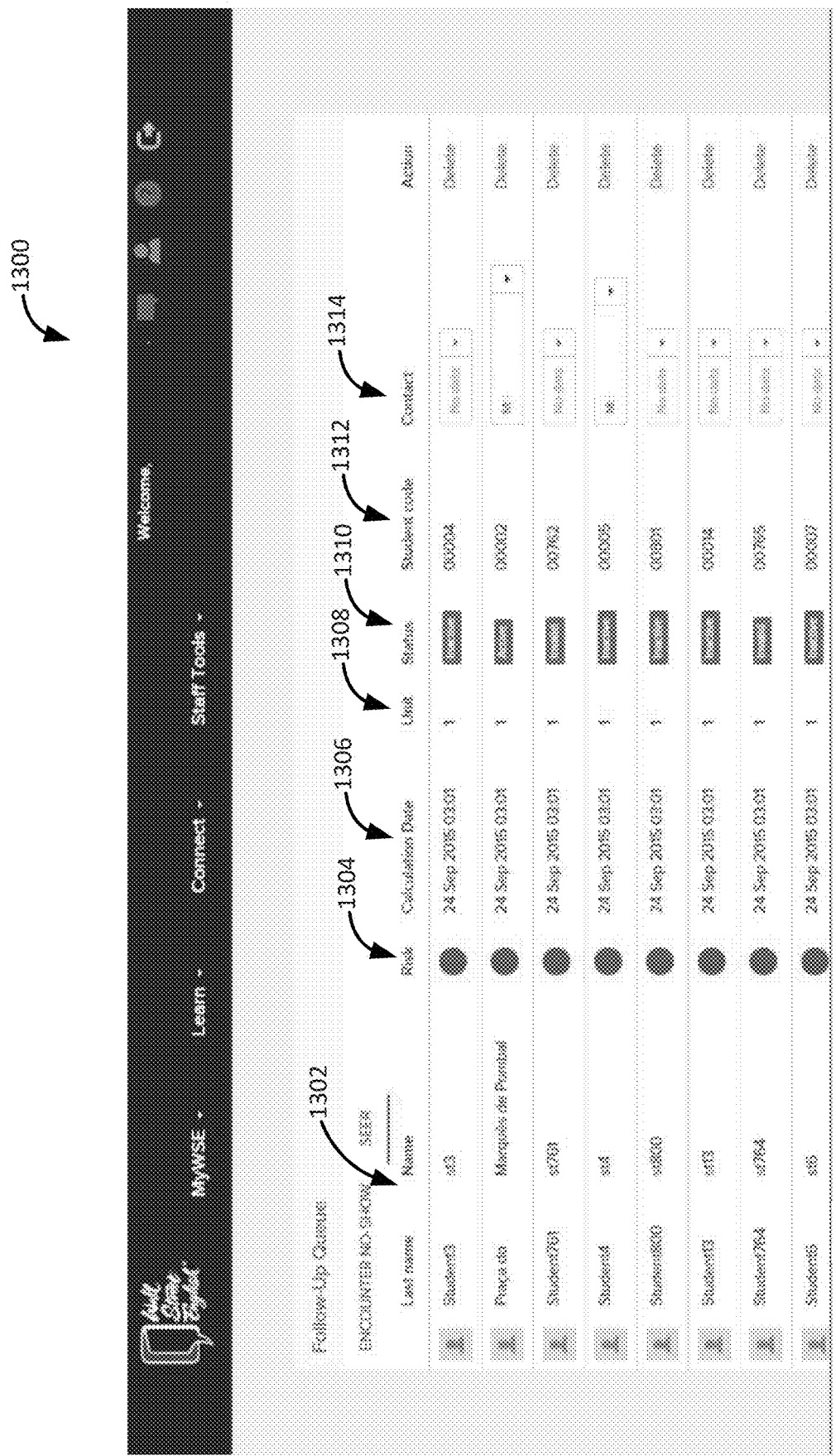
FIGS. 13 and 14 depict embodiments of a follow-up queue in a Graphical User Interface (GUI).
Figure 14:
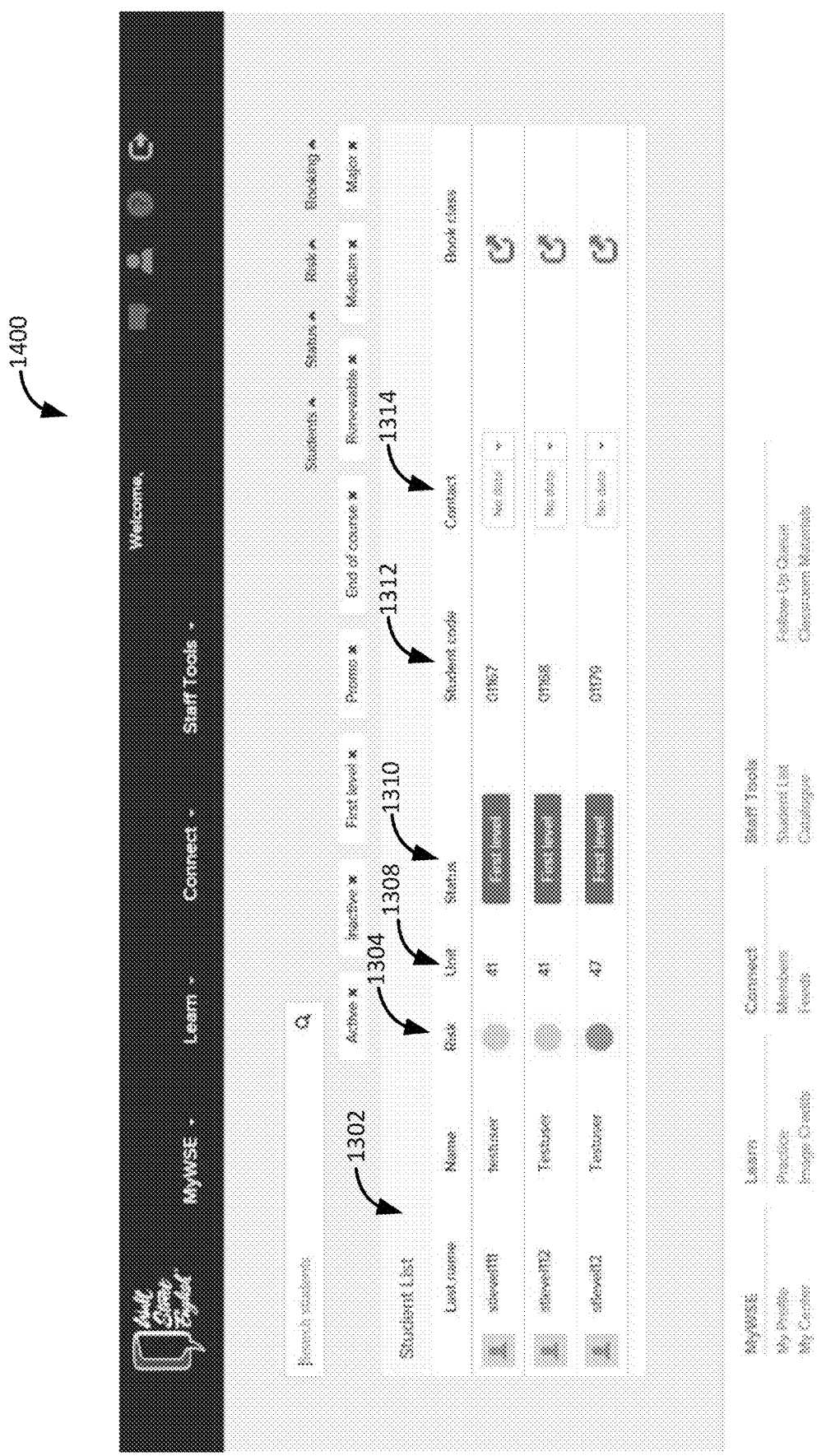

With reference now to FIGS. 13 and 14, depictions of a follow-up queue page 1300, 1400 in a Graphical User Interface (GUI) are shown. The follow-up queue page 1300, 1400 include a list of one or several student-users identified as having an unacceptably high risk probability. In some embodiments, the follow-up queue page 1300, 1400 can include student-user identifiers 1302 identifying the one or several student-users identified on the follow-up queue page 1300, 1400.

The follow-up queue page 1300, 1400 can further include a risk indicator 1304 that can indicate the student-user's risk probability of not achieving a desired, specified outcome. In some embodiments, this risk indicator 1304 can numerically display a risk percent, and in some embodiments, this risk indicator can graphically display a risk percent such as via, for example, through a color coding scheme wherein different colors correspond to different risk probabilities and/or different risk probability ranges.

The follow-up queue page 1300, 1400 can include date information 1306. In some embodiments, the date information 1306 can identify the date and/or time at which the risk probability for the student-user was calculated. The follow-up queue page 1300, 1400 can further include a unit indicator 1308 that identifies the next unit or the current unit of the student-user in the program, and/or a status indicator 1310 indicating whether the student is actively completing the current unit. The follow-up queue page 1300, 1400 can further include an encoded student-user identifier 1312 and contact information 1314 for the student user.

Figure 15:
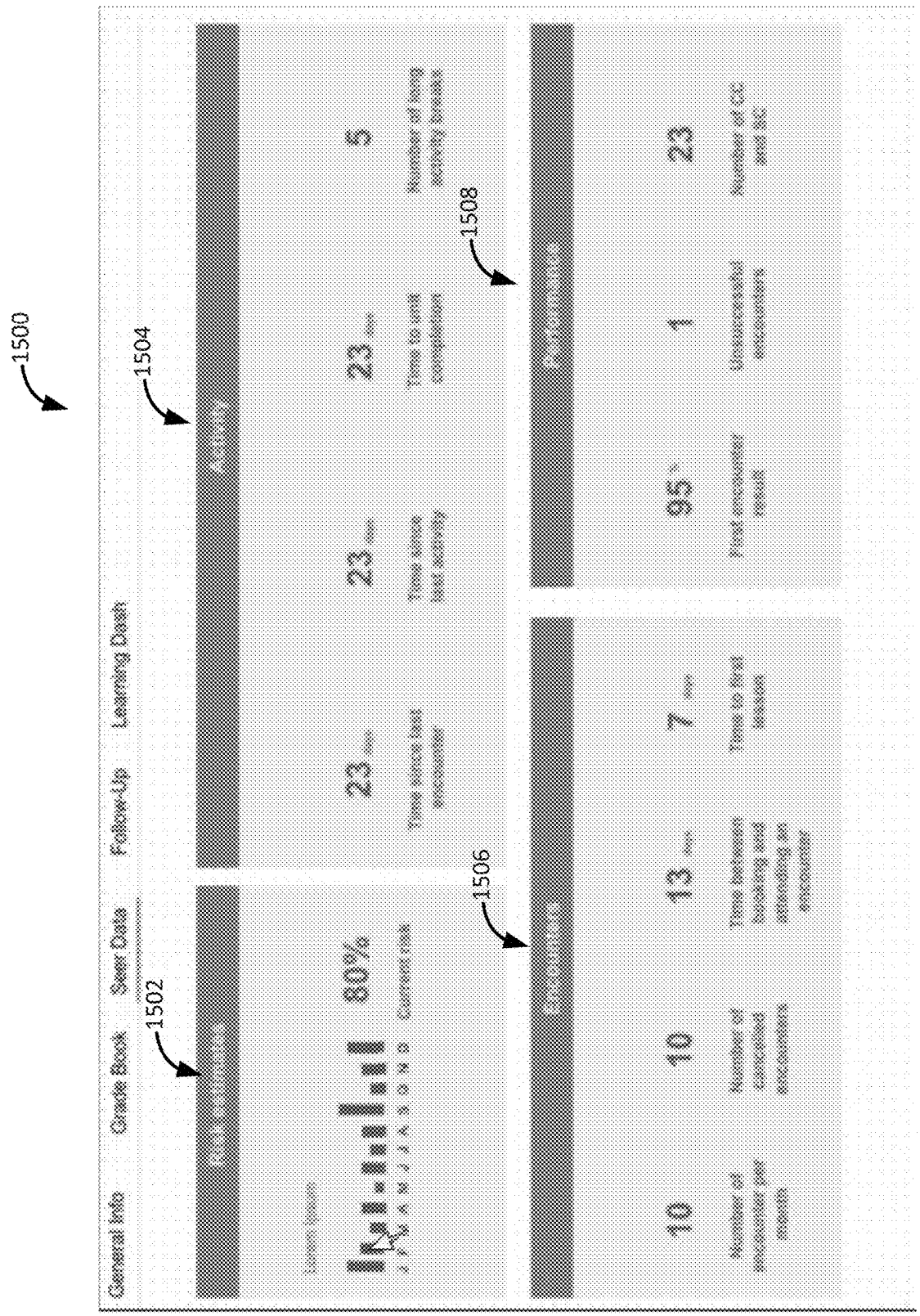
FIG. 15 depicts one embodiment of an alert data page in a Graphical User Interface (GUI).

With reference now to FIG. 15, a depiction of one embodiment of an alert data page 1500 in a Graphical User Interface (GUI) is shown. In some embodiments, the supervisor can select to view the alert data page for one of the student-users from the follow-up queue page 1300, 1400 and/or for the student user of the user page 1100, 1200. The alert data page 1500 can display alert data such as, for example, the student-user's risk estimates, and data related to student-user performance and/or involvement with the content distribution network 100. As seen in FIG. 15, the alert data page 1500 can include a risk estimate display 1502, and an activity display 1504. In some embodiments, the activity display can display information such as the amount of time since the last encounter and/or last activity, the estimated amount of time until unit completion, and/or the number of long activity breaks.

The alert data page 1500 can further include an encounter display 1506. The encounter display 1506 can include information relating to the number of encounters in a time period such as the number of encounters per month, the number of cancelled encounters, the time between booking and attending an encounter, and the amount of time until the first lesson. In some embodiments, the alert data page 1500 can include a performance indicator 1508. In some embodiments, the performance indicator can identify the result of the first encounter in percent form, and/or the number of unsuccessful encounters.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for automated alert provisioning comprising:
    identifying a user's progress through a content program;
    determining that the user's progress at least meets a status trigger threshold corresponding to a defined point in progression through the content program, the defined point corresponding to partial completion of the content program;
    triggering a risk calculation in response to determining that the user's progress at least meets the status trigger threshold;
    selecting a model function associated with the status trigger threshold from an identified set of potential model functions;
    calculating a model function value with the model function by performing one or more mathematical operations on current program status parameters;
    calculating a risk probability with the model function value, the risk probability characterizing risk of the user not achieving a desired outcome;
    determining that the risk probability exceeds a threshold level;
    generating an alert with a content management server in response to determining that the risk probability exceeds the threshold level; and
    sending the alert to a supervisor device when the risk probability exceeds the threshold level.

2. The method of claim 1, wherein selecting the model function further comprises:
    identifying the set of potential model functions; and
    determining that the model function is associated with the status trigger threshold.

3. The method of claim 1, wherein the risk threshold is associated with at least one of the model function or the current program status parameters.

4. The method of claim 1, further comprising:
    identifying a device for receipt of the alert.

5. The method of claim 4, wherein the supervisor device is selected from a personal supervisor device and a shared supervisor device.

6. The method of claim 5, further comprising:
    determining whether the shared supervisor device is actively being used; and
    identifying one of the personal supervisor device or the shared supervisor device as a default device based on whether the shared supervisor device is actively being used.

7. The method of claim 6, wherein generating the alert further comprises:
    determining that a content library database includes information indicating that at least one intervention of a set of interventions should be recommended for the content program;
    selecting an intervention of the set of interventions; and
    providing the intervention in the alert.

8. The method of claim 7, wherein the intervention is selected based on an identified risk source.

9. A method for remote alert triggering comprising:
    identifying a user's progress through a content program;
    determining that the user's progress at least meets a status trigger threshold corresponding to a defined point in progression through the content program, the defined point corresponding to partial completion of the content program;
    triggering a risk calculation in response to determining that the user's progress at least meets the status trigger threshold;
    selecting a model function based on current program status parameters that quantify interactions of the user with the content program;
    calculating a model function value with the model function by performing one or more mathematical operations on the current program status parameters; and
    calculating a risk probability with the model function value, the risk probability characterizing risk of the user failing to achieve a desired outcome in the content program;
    receiving location data from a supervisor device, the location data identifying a location of the supervisor device and use status of the supervisor device;
    generating an alert when the risk probability exceeds a risk threshold; and
    upon generating the alert, sending the alert to the supervisor device.

10. The method of claim 9, further comprising:
    retrieving the risk threshold, wherein the risk threshold is associated with at least one of: the model function or the current program status parameters;
    comparing the risk threshold and the risk probability; and
    determining to send the alert when the risk probability exceeds the risk threshold.

11. The method of claim 9, wherein determining that the user's progress at least meets the status trigger threshold comprises:

receiving the status trigger threshold from a memory;

comparing the current program status parameters of the user to the status trigger threshold; and triggering the risk calculation when the current program status parameters at least meet the status trigger threshold.

12. The method of claim 11, wherein the supervisor device is selected from a personal supervisor device and an other supervisor device, and wherein the location data identifies the location and the use status of the personal supervisor device or the other supervisor device.

13. The method of claim 12, further comprising:

identifying one of the personal supervisor device or the other supervisor device as recipient of the alert based on the location data.

14. The method of claim 13, further comprising: displaying the risk probability via generation and display of a risk indicator.

15. The method of claim 14, wherein the risk indicator comprises a graphical display of the risk probability.

16. The method of claim 14, wherein the risk indicator comprises a numeric display of the risk probability.

17. The method of claim 9, further comprising receiving an identifier of the user from a user device, wherein the identifier comprises user device location information.

18. The method of claim 9, further comprising:

selecting and providing an intervention, wherein the intervention is selected based on an identified risk source, and wherein the intervention is provided in the alert.

* * * * *